April 17, 1962  E. S. NIELSEN  3,029,504
METHOD OF MAKING A CYLINDRICAL MEMBER
Filed May 4, 1959
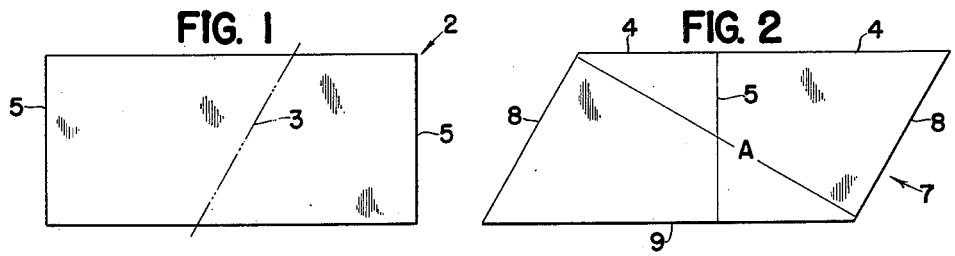
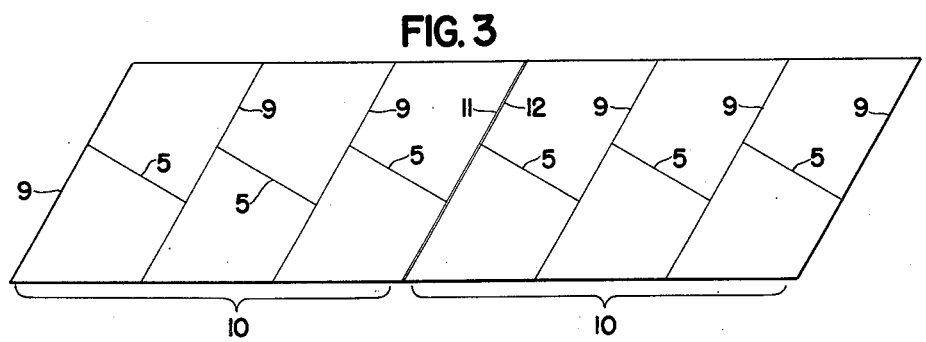
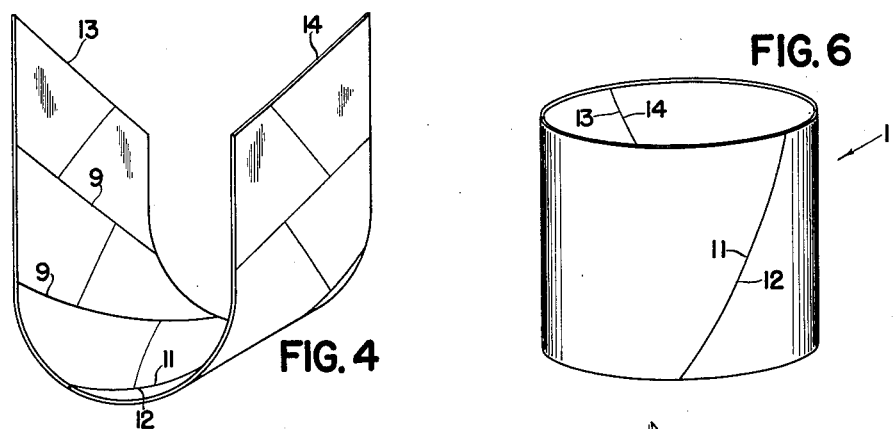
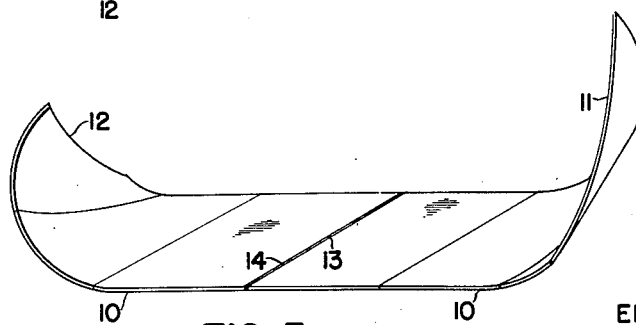
INVENTOR.
EINER S. NIELSEN
BY *Andrus & Starke*
Attorneys 3,029,504
METHOD OF MAKING A CYLINDRICAL
MEMBER
Einer S. Nielsen, Milwaukee, Wis., assignor to A. O. Smith Corporation, Milwaukee, Wis., a corporation of New York
Filed May 4, 1959, Ser. No. 810,868
3 Claims. (Cl. 29—425)

This invention relates to a method of making a heavy gauge cylindrical member for use as a paper drying roll.

Large, cylindrical drying rolls are used in the paper manufacturing industry for the steam processing of paper articles such as absorbent sanitary tissue and resilient packing materials. For practical operation, drying rolls used in this process are often as large as twelve feet in diameter, fifteen feet in length, and have a cylinder wall thickness of about two inches. The conventional paper drying roll is made of cast iron, and further improvement in the paper processing is limited in part by the heat transfer rate of the conventional cast iron drying roll. Circumferential drying speed can be improved by using a metal alloy, such as a bronze to make a drying roll, because bronze has better heat transfer characteristics. Casting bronze into a large shell structure in a single casting operation is difficult because of the metallurgical characteristics of bronze. However, smaller bronze plates may be welded together and then rolled to form the desired cylindrical structure by a series of forming operations.

The present invention provides a new method of making large cylindrical structures, for use as paper drying rolls, by a combined welding and roll forming process.

According to the invention, two large rhomboidal plates are formed by welding together a plurality of small, rhomboidal plates having sides of unequal length. The two large rhomboidal plates are then temporarily tack welded to form a larger rhomboidal plate. The weld seams are preferably located diagonally at an angle to both the longitudinal and circumferential planes in the completed cylindrical structure and thus better distribute operational stresses, since the expansion and heat transfer characteristics of the weld metal and the bronze plate components differ. Weld seam fatigue is avoided by the diagonal weld seams, and angular placement of the weld seam also avoids a possible breach between welded plates during the rolling operation, since only a small portion of the weld seam is in contact with the rolls at any point in the forming operation.

The larger tack welded rhomboidal plate is then rolled at its central portion to obtain a semi-cylindrical cross-section therein. The temporary tack weld is removed, and the opposite uncurved edges of the two original plates are then permanently welded. The composite larger plate so formed is rolled into a cylinder, with the edges which were first temporarily tack welded coming into opposed position during the last forming operation. These edges are then permanently rewelded, resulting in a heavy gauge cylindrical member. The above method enables the forming of a true cylinder solely by the use of a rolling mill and the step-wise welding procedure. The resulting product has no axial or girth welds, all welds being at an angle to either the longitudinal or circumferential planes, thereby increasing operational strength of the structure.

While the method of this invention may be employed in making small sized cylindrical structures and curvilinear shapes, this procedure is particularly adapted to produce large cylindrical structures from metal alloys, such as bronze, in which the final dimensions desired exceed the capacity of conventional single-step forming processes.

Other objects and advantages of this invention will appear in the course of the following description.

The accompanying drawings illustrate the best mode presently contemplated for carrying out the invention.

In the drawings:

FIGURE 1 is a plan view of a relatively small plate member as is employed in making the cylindrical structure of this invention and the dashed line indicates the location at which the plate is severed;

FIG. 2 is a plan view showing the severed plate members reassembled and welded together to form relatively small rhomboidal plate sections;

FIG. 3 is a plan view showing a plurality of the small rhomboidal plate sections assembled and welded together into a large rhomboidal plate;

FIG. 4 is a perspective view of the large rhomboidal plate showing the central portion of the plate rolled to obtain a semi-cylindrical cross-section therein;

FIG. 5 is a perspective view showing the component curvilinear rhomboidal plates separated at the tack weld seam, reversed, and permanently welded at the opposite uncurved edges; and FIG. 6 is a perspective view showing the completed cylindrical member after the curvilinear rhomboidal plate is rolled into a cylinder and the edges which were first tack welded are permanently re-welded.

Referring to the drawings, the cylindrical shell 1, shown in FIG. 6, is fabricated from a plurality of small rectangular plates 2 shown in FIGURE 1. The plates 2 are preferably fabricated from a readily weldable material having a high heat conductive capacity, such as aluminum-bronze, manganese-bronze or the like.

Each plate 2 is cut diagonally across the narrow dimension of the plate as indicated by the dashed line 3 in FIGURE 1 to provide a pair of trapezoidal plate sections 4 of substantially the same size and shape. The square ends 5 of each pair of trapezoidal plate sections 4 are suitably machined for welding and disposed in abutting relation with the plate sections aligned longitudinally. The ends 5 are then permanently secured together by means of a weld to form the rhomboidal plates 7 of FIG. 2. The dimension A, as measured on a line normal to and between the narrow ends 8 of plates 7, corresponds generally to the length of the shell structure to be fabricated.

The long sides 9 of the rhomboidal plates 7 are then suitably machined for welding and a plurality of the plates are disposed in longitudinal arrangement with the long sides 9 in abutting relation and the narrow ends in aligned relation. The adjacent plates are welded together along the long sides 9, to form two flat sheets 10 of rhomboidal configuration, as shown in FIG. 3. The two flat plates 10 are then temporarily tack welded at the edges 11 and 12 to form a large rhomboidal shaped blank, the temporary weld being at the center thereof as shown in FIG. 3.

The large rhomboidal shaped blank is then rolled at the central portion thereof to obtain a semi-cylindrical cross-section as shown by FIG. 4. The temporary tack weld seam at the edges 11 and 12 is then severed, and the opposed uncurved edges 13 and 14 are permanently welded, as shown in FIG. 5, to form a curvilinear blank. The curvilinear blank is then rolled into a cylinder, and the edges 11 and 12 are brought into opposed relation and are then permanently rewelded to form the cylindrical shell 1, having all the weld seams arranged diagonally to the axis of the shell.

The present method enables a large rhomboidal or parallelogram-shaped blank to be rolled to cylindrical shape. Normally a rhomboidal blank cannot be rolled into cylindrical form because less rolling pressure is required to form the tips of the oblique ends of the blank to a given radius of curvature than the body of the blank. Therefore with constant rolling pressure the rhomboidal blank would not be formed with a uniform radius of curvature in the conventional process.

However, in the method of the invention the rolling is applied only to the central portion of the blank, where the width is constant, so that a uniform curvature will result. The free oblique ends of the rhomboidal blank are not subject to rolling. By initially tack welding the edges 11 and 12 and then rolling this area to cylindrical contour and then subsequently severing the tack weld, welding the edges 13 and 14 and rolling this area, an accurately dimensional cylindrical shell can be obtained.

Furthermore, the initial tack welding and rolling of edges 11 and 12 insures that these edges will be properly matched or aligned for permanent welding at the completion of the rolling operation.

Various modes of carrying out the invention are contemplated as being within the scope of the following claims particularly pointing out and distinctly claiming the subject matter which is regarded as the invention.

I claim:

1. A method of rolling to a cylindrical shape a rhomboidal shaped flat blank composed of a plurality of rhomboidal plates welded together by means of diagonal welds extending along the adjacent edges thereof and having generally parallel oblique ends, comprising initially rolling only a portion of the blank intermediate the oblique ends to avoid thinning the oblique ends of the blank and to provide said intermediate portion with a generally semi-cylindrical radius of curvature, severing the blank through said intermediate portion on a line generally parallel to said oblique ends to provide separate blank sections each having a curved oblique end and a flat oblique end, welding the flat oblique ends together to provide a curvilinear blank having a generally flat central section and curved ends, rolling only the central section of the curvilinear blank to provide the same with a cylindrical cross section whereby the flat oblique ends are rolled without thinning due to the constant pressure of the forming rollers and the curved oblique ends are brought into substantial matching alignment, and welding the curved oblique ends of the curvilinear blank together to form a cylindrical member of uniform wall thickness having only diagonal seam welds to better distribute operational stresses in the cylindrical member developed by differences in the expansion and heat transfer characteristics of the weld metal and the plate metal.

2. A method of making a large cylindrical member having diagonal weld seams from a plurality of rhomboidal plates by a rolling method in which thinning of the diagonal edges of said plates is avoided, the steps comprising, assembling together a plurality of small rhomboidal plates each having a pair of generally parallel first edges and a pair of generally parallel second edges disposed diagonally to said first edges, said plates being disposed with the first edges longitudinally aligned and the second edges opposed, welding together a plurality of said plates to form a rhomboidal blank having diagonal weld seams and having a pair of parallel first edges and parallel second edges, temporarily welding together two identical rhomboidal blanks so formed along their opposed second edges to form a large rhomboidal blank having a temporary weld extending diagonally to said first edges, rolling only the intermediate portion of the large rhomboidal blank at the area of the temporary weld to avoid thinning of the diagonal edges of said blank due to the constant pressure of the rollers and to obtain a generally semi-cylindrical radius of curvature of the blank in said intermediate portion, cutting the temporary weld to separate the large rhomboidal blank into two curved rhomboidal blanks each having a curved end and a flat end, permanently welding the flat ends of said curved blanks to form a curvilinear blank having a flat intermediate portion, rolling only the intermediate portion of said curvilinear blank thereby bringing the curved ends of said blank into substantially matching alignment without thinning of the curved ends of said blank, and rewelding said curved ends to form a large cylindrical member of uniform thickness throughout having diagonal seam welds.

3. A method of making a cylindrical member having only diagonal seam welds from a plurality of rectangular plates, the steps comprising, cutting each plate on a similar bias intermediate its ends to form a pair of trapezoidal plate sections each having a square end and an opposed oblique end, placing the trapezoidal plate sections formed from each rectangular plate in longitudinal alignment with the square ends in opposed relation, permanently securing the opposing square ends together to form a rhomboidal plate member having parallel sides normal to the square ends and having generally parallel oblique ends, assembling together a plurality of said rhomboidal plate members with the oblique ends aligned and the sides opposed, welding together the adjacent sides of said rhomboidal plate members to form a larger rhomboidal plate section having parallel sides and parallel oblique ends, said plate being large enough to form approximately half the circumference of the cylindrical member, temporarily welding the opposing parallel sides of two rhomboidal plate sections to form a large rhomboidal blank having a temporary diagonal weld in the portion intermediate the oblique ends, rolling only the central portion of the larger rhomboidal blank to avoid thinning the oblique ends due to the constant pressure of the rollers and to obtain a semi-cylindrical radius of curvature in the central portion of said blank, removing the temporary diagonal weld to obtain two partially curved blanks, each having a curved end and a flat end, permanently welding the flat ends of said partially curved blank to form a large curvilinear blank having curved ends and a flat intermediate portion, rolling only the flat intermediate portion of said large curvilinear blank to bring the curved ends into substantial matching alignment without thinning said ends, and permanently welding together the curved ends which were first temporarily welded to provide a large cylindrical member of uniform thickness having only diagonal seam welds to better distribute operational stresses in the cylindrical member when it is used as a paper drying roll.

References Cited in the file of this patent

UNITED STATES PATENTS

| | | |
|---|---|---|
| 786,923 | Smith | Apr. 11, 1905 |
| 1,341,967 | Barrows | June 1, 1920 |
| 1,916,051 | Jagschitz | June 27, 1933 |
| 1,931,162 | Krantz et al. | Oct. 17, 1933 |
| 2,496,626 | Jackson | Feb. 7, 1950 |
| 2,763,924 | Bellometti | Sept. 25, 1956 |